United States Patent [19]

Hirsch

[11] 4,008,567
[45] Feb. 22, 1977

[54] TORQUE CONTROL SYSTEM

[76] Inventor: Joseph Hirsch, 4746 59th St., San Diego, Calif. 92115

[22] Filed: Apr. 28, 1975

[21] Appl. No.: 572,236

[52] U.S. Cl. .......................... 60/39.28 P; 74/866; 74/DIG. 5; 416/30
[51] Int. Cl.² ........................................ F02C 9/08
[58] Field of Search ............... 60/39.28 P, 39.16 R, 60/39.16 S, 39.24; 74/DIG. 5, 865, 866; 416/30

[56] References Cited

UNITED STATES PATENTS

| 2,985,243 | 5/1961 | Tyler | 60/39.28 P |
|---|---|---|---|
| 3,043,162 | 7/1962 | Kugel | 74/DIG. 5 |
| 3,095,701 | 7/1963 | Grosselfinger | 60/39.16 R |
| 3,588,272 | 6/1971 | Lindahl | 416/30 X |
| 3,598,211 | 8/1971 | Fergie | 60/39.16 R |
| 3,709,069 | 1/1973 | Hagen | 74/DIG. 5 |
| 3,710,647 | 1/1973 | Dach | 74/866 X |
| 3,729,928 | 5/1973 | Rowen | 60/39.28 P |
| 3,732,753 | 5/1973 | Olsen | 74/866 |
| 3,752,011 | 8/1973 | Casey | 74/866 |
| 3,890,360 | 6/1975 | Pruvot | 74/866 |
| 3,927,528 | 12/1975 | Kolk | 74/865 |

*Primary Examiner*—Clarence R. Gordon
*Attorney, Agent, or Firm*—Richard S. Sciascia; Ervin F. Johnston; William T. Skeer

[57] ABSTRACT

A torque control system designed to economize on consumed fuel includes a source of motive power, a load and a transmission coupling the motive power to the load. A torque measuring device is attached to the output of the transmission and senses a torque applied to the load. The output of the torque sensor is compared with electrical analogs of optimized torque situations. The comparison results in the development of a control voltage which is applied to the source of motive power and the transmission to effect optimization of torque control.

13 Claims, 6 Drawing Figures

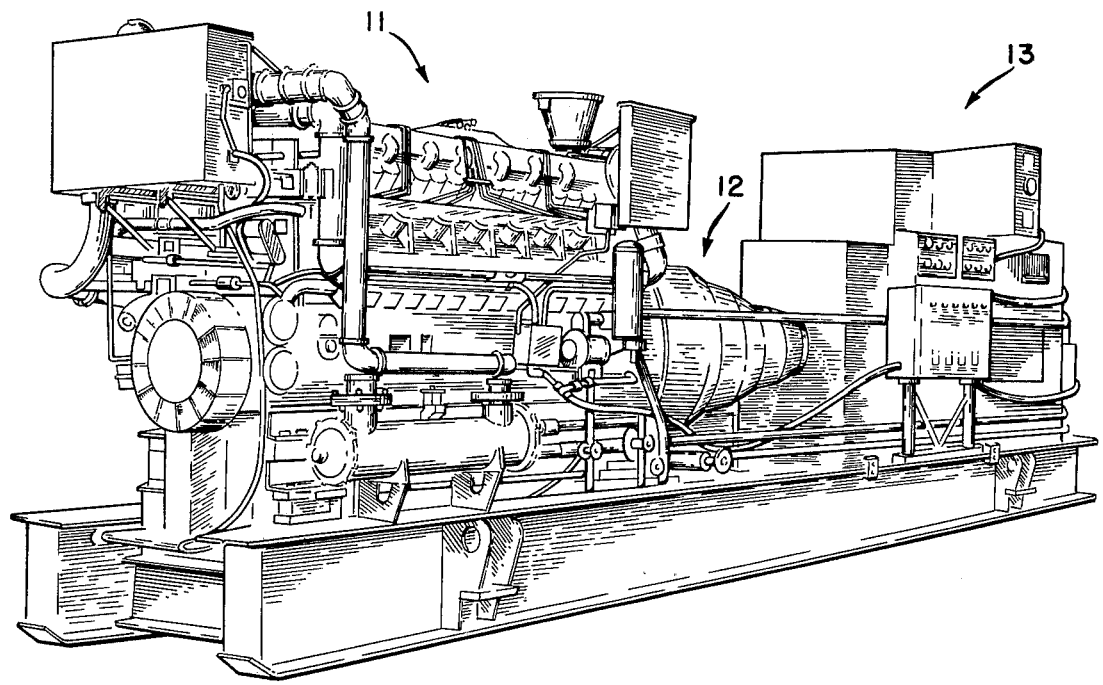
FIG. I
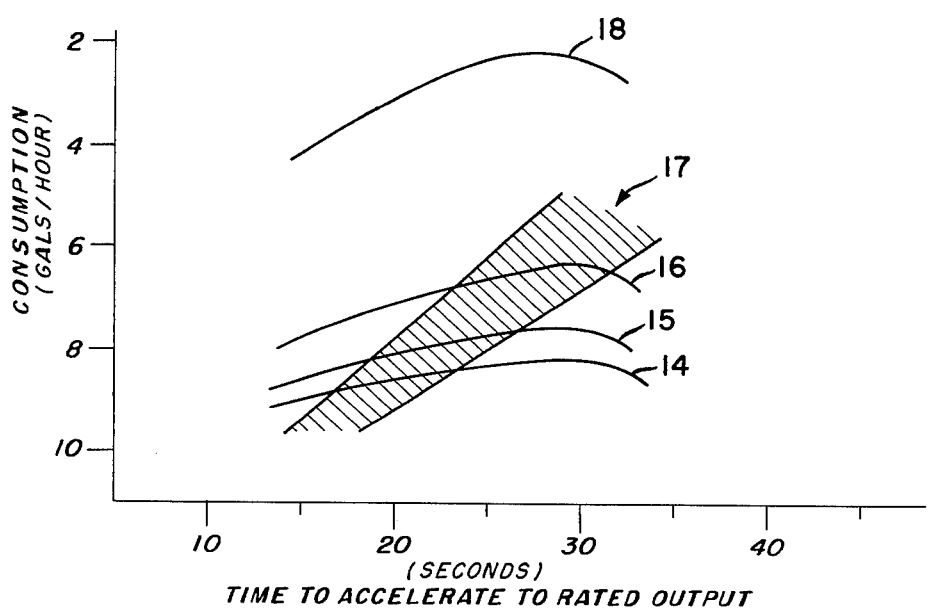
FIG. 2

TORQUE CONTROL SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to cybernetic controls. More particularly, this invention pertains to the control of a motive power system employing fluid inputs. In still greater particularity, this invention provides a torque sensitive control system which optimizes the output of a motive power source to effect maximum fuel economy. Additionally, this invention pertains to the control of both a transmission coupling device and a source of motive power. By way of further characterization, but without limitation thereto, the invention will be described as it pertains to the control of reciprocating and turbine engines coupled to a load by means of a torque converter transmission.

DESCRIPTION OF THE PRIOR ART

The recent, world-wide attention given to the necessity for conserving fossil fuels has resulted in a renewed effort to ensure at the consumption efficiencies of systems employing these fuels to be at the absolute maximum. This effort to ensure maximum utilization of the scarce fuels has emphasized the need for careful considerations of the prior art systems, particularly where large, motive power plants are used. As an example of such installations, the need for conservation of fossil fuels is particularly critical in the large systems employed in the marine engineering.

In the past, due to certain tax advantages and other considerations, chief among them the cost and seeming inexhaustibility of fuel, little attention has been given to spatial compactness and fuel consumption efficiency of marine motive power systems. Instead, the major thrust of design effort has been toward safety and dependability. Dependability, thanks to modern production techniques, is no longer the problem that it once was and dependable operation may be obtained from motive power sources, which are of compact dimensions. This is a marked distinction to the systems of the prior art, in which very large displacement engines were permitted to idle or operate at speeds in which the fuel efficiency was quite low.

SUMMARY OF THE INVENTION

The invention provides a torque control system in which the torque of the motive power input is carefully sensed as it is applied to the load. This sensed torque is converted to an electrical analog of the actual torque output of the motive power unit and compared with known operating parameters, also represented by electrical analogs, to develop a control signal to keep the motive power system at a peak efficiency. This control signal may also be used to control a transmission between the motive power source and the load. That is, a torque converter type transmission may be employed to help the motive power system overcome high torque demands associated with starting and peak operational loads. Although the inclusion of high torque transmission increases the installed cost of the power system, the increased efficiency made possible by using a smaller source of power and an improved fuel efficiency makes such inclusion commercially feasible, whereas prior art systems would have eschewed such mechanical sophistication.

STATEMENT OF THE OBJECTS OF THE INVENTION

It is accordingly an object of this invention to provide a torque control system.

Another object of this invention is to provide a torque control system optimizing the torque output of a motive power source.

Further object of this invention is to provide a torque control system which controls both the motive power device and associated transmission.

A further object of this invention is to provide a torque sensor control for a marine power unit.

A further object of this invention is to provide a torque control system for optimizing the fuel efficiency of a turbine motor.

Still another object of this invention is to provide a torque control system optimizing the fuel economy of a reciprocating power plant.

These and other objects of the invention will become more readily apparent from the ensuing specification when taken with the drawings.

BRIEF DESCRIPTION OF THE DRAWINGS

FIG. 1 is a perspective drawing of the invention as it is incorporated in a reciprocating type power plant;

FIG. 2 is a graphic representation showing the operational parameters of power systems employing the invention;

DESCRIPTION OF THE PREFERRED EMBODIMENTS

Figure 3:
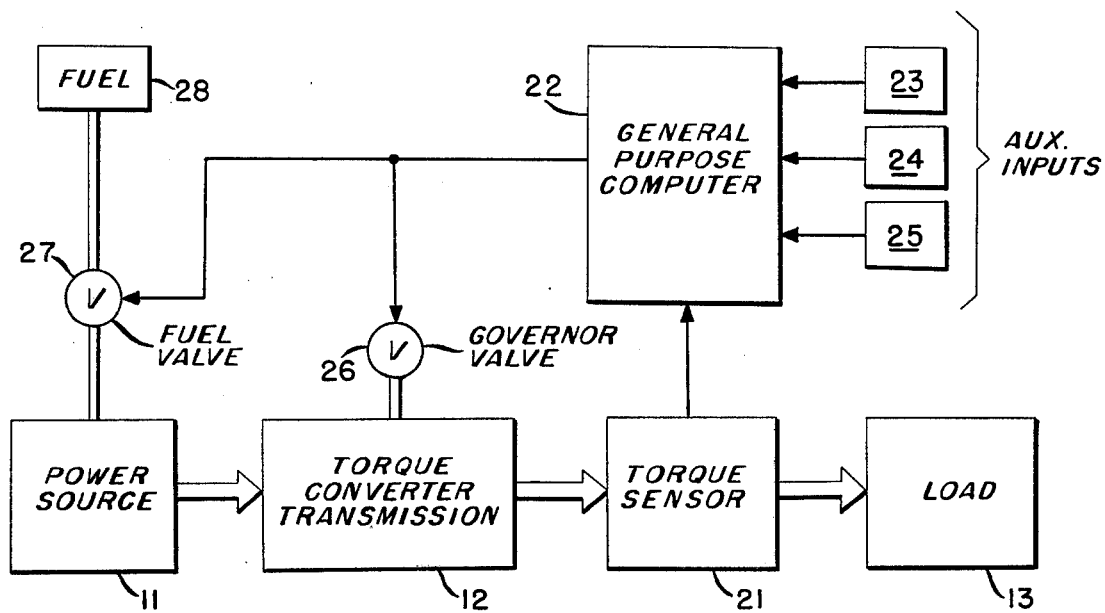
FIG. 3 is a diagrammatic representation of the major components of the system of the invention.

Referring to FIG. 1, a reciprocating engine such as a marine diesel engine 11, is shown connected to a transmission 12 which, in turn, drives an electrical generator 13. Such installations are typical of marine applications of motive power systems, however, it should be understood that the load represented by an electrical generator 13 may be any simple load including the propulsion screws of the vessel itself, cargo handling equipment, or ventilating systems.

Referring to FIG. 2, a graphic representation of the operational parameters of marine power plants as the comparison of fuel consumption to time needed to reach a rated output or load is illustrated. Curve 14 fairly represents that of present day gas turbine engines. Similarly, curve 15 indicates a range of values appropriate to current diesel engines while curve 16 represents a greater average of fuel economy, which may be obtained with steam turbines. A shaded area 17 indicates the general range for each of these type motive power plants of the design considerations of present marine engine facilities. That is, marine power plants are generally chosen to be of such a size and efficiency to fall within the shaded area. Such power plants were here-to-fore considered satisfactory.

The careful use of torque control system of the invention and torque multiplication available through a torque converter type transmission 12 has permitted a consumption shown as curve 18 to be obtained with both gas turbine and reciprocating and diesel engines. Thus, the marked efficiency of the system of the invention may be readily perceived. This achievement of efficiency has been obtained by a cybernetic type control system in which the efficiency of the motive power plant is regulated to permit variations only over a very narrow range.

Referring to FIG. 3, a diagrammatic representation of the system of the invention is shown in greater detail. A power source 11 transmits mechanical energy, indicated by the hollow arrows, to torque converter transmission 12. Torque converter transmission 12 is, in turn, mechanically coupled to load 13 to provide a drive for that load and this mechanical output is monitored by torque sensor 21. Torque sensor 21 may be any electromechanical transducer suitable for the measurement of shaft torque and follows conventional design practice. Since a variety of standard conductively coupled and separating coupled systems are known in the prior art, and need not be further described herein. However, for purposes of completeness, attention is directed to "The Strain Guage Primer", by C. C. Perry and H. R. Lisener published by McGraw Hill Book Company, Inc., New York, 1962, Library of Congress catalog no. 62-14220, for discussion of the operation of these devices. It should be noted that sensors manufactured by the Baldwin-Lima-Hamilton Corporation have proven satisfactory in development models of the invention.

The output from torque sensor 21 is an electrical analog of the torque input of motor 11 as transmitted by transmission 12. This electrical analog is compared by circuitry which may be connected to, or an integral part of, a general purpose computer 22. The desired comparison is made by comparing the electrical analog of the torque being produced with the ideal torque output characteristics of the particular power source 11 being utilized under a variety of operational parameters. The individual operational parameters associated with different fuels, and other system conditions may be varied and also fed to the general purpose computer by means of suitable auxiliary inputs 23, 24, and 25. Although three such inputs are shown, it should be understood that additional inputs may be used or, in some cases, fewer auxiliary inputs than the three required may be provided.

Thus, if power source 11 were a reciprocating diesel engine, the general purpose computer 22 may compare the electrical analog produced by torque sensor 21 with the optimized torque output of the reciprocating engine in various operational conditions. These operational parameters could be varied by the illustrated auxiliary inputs 23, 24 and 25 and might, for example, include the type of fuel being used, the ambient air pressure and ambient air temperature. In this manner, to be explained in greater detail herein, a control voltage is produced and used to control a governor valve 26 to operate torque converter transmission 12, and a fuel valve 27 used to regulate the flow of fuel from a suitable tank, indicated at 28, to the reciprocating diesel engine.

Figure 4:
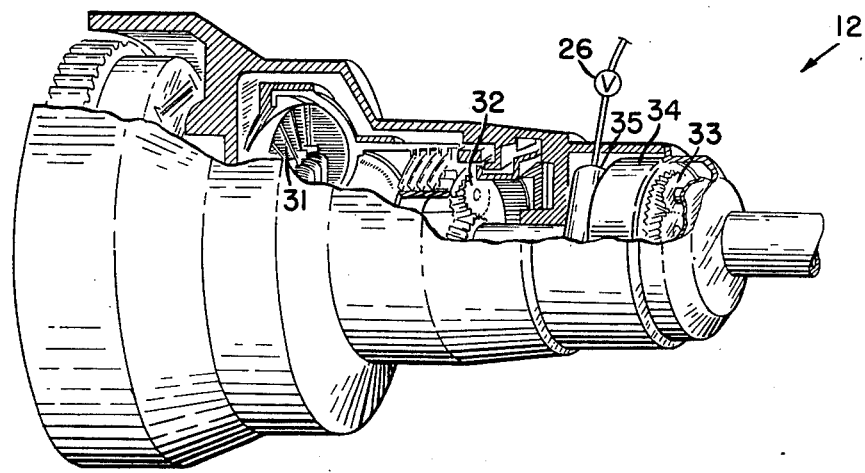
FIG. 4 is a partial cut-away view of a transmission used in the practice of the invention.

Referring to FIG. 4, a torque converter type transmission of the type employed is illustrated. As shown, coupling to source of motive power 11 is made via conventional fluid coupling 31. A pair of planetary gear systems 32 and 33 are selectively actuated to determine the gear reduction to the output shaft of transmission 12. The actuation of planetary gear 33 is made by brake band 34 which contracts circumferentially about the ring gear of the gear set 33 in a conventional fashion. This actuation of brake band 34 is accomplished by means of a hydraulic cylinder 35 which is actuated by control valve 26. Of course, a similar actuation technique may be employed to selectively engage gear set 32, if desired.

Figure 5:
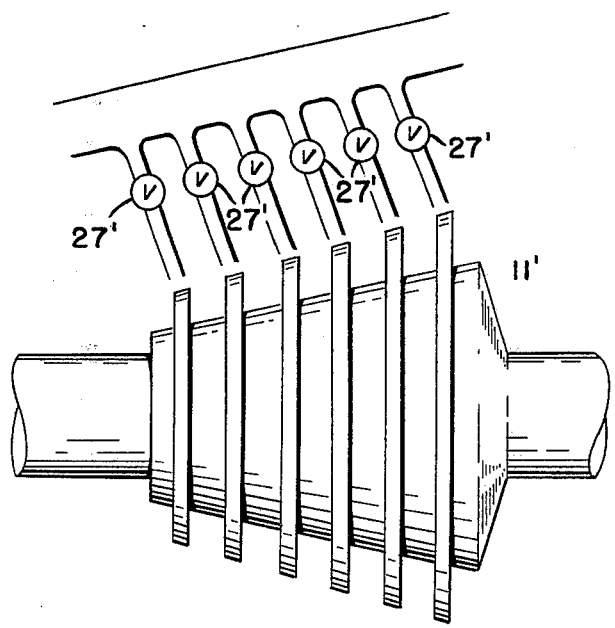
FIG. 5 is a schematic representation of a turbine power plant employing the invention.

Referring to FIG. 5, a turbine source of motive power as illustrated at 11'. As shown, a rotor assembly has a plurality of vaned rotors thereon, each of which has operating fluid selectively transmitted thereto by means of valves 27'. In gas turbines, valves 27' may admit operating fuel. In the case of steam turbines, valves 27' may control high pressure steam lines.

Figure 6:
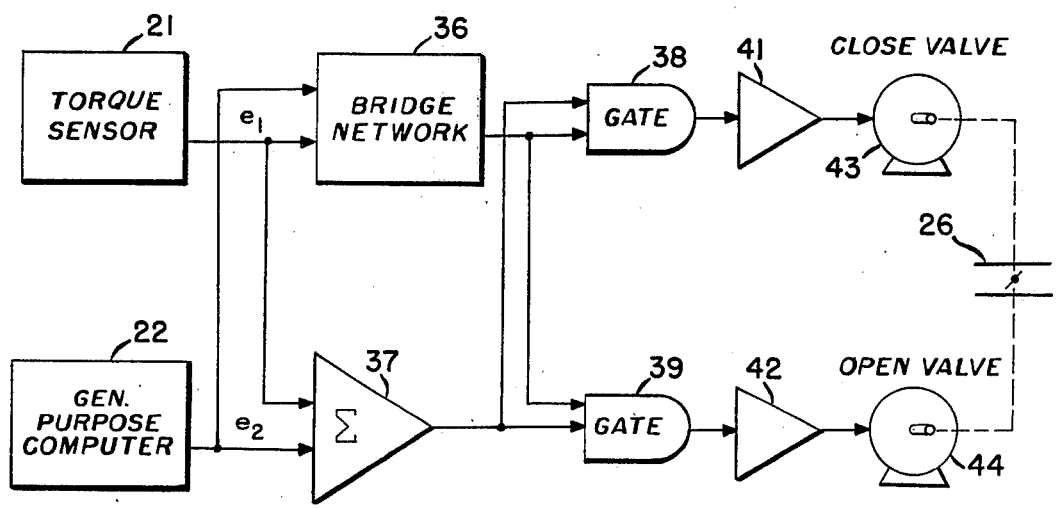
FIG. 6 is a diagrammatic representation of the enabling circuitry of the invention.

Referring to FIG. 6, the schematic diagram to accomplish the voltage comparison and generation control signals therefrom is illustrated. Torque sensor 21 applies a voltage $e_1$ to a network 36. Similarly, a source of electrical signals such as general purpose computer 22 supplies a second voltage $e_2$ to bridge network 36 and summing amplifier 37. $e_1$ and $e_2$ are selected to be of opposite polarity such that the output of bridge network 36 indicates which voltage is of a greater magnitude. Bridge network 36 controls gate circuits 38 and 39 which also receive the sum or composite voltage from summing amplifier 37. Thus, when voltage $e_1$ is equal in magnitude to voltage $e_2$, the output from summing amplifier 37 is zero or a null. As this null value is approached the signal diminishes in value and, correspondingly, increases as the supply voltage $e_1$ and $e_2$ differ. Gate circuits 38 and 39 feed the respective gated signals in dependence upon the polarity of the output bridge network 36 to amplifiers 41 and 42 which in turn control suitable drive means such as electric motors 43 and 44. As illustrated, motor 43 closes valve 26 and motor 44 opens valve 26. Of course, a similar system is to be employed to operate the valve 27. Likewise, a series of circuits such as shown in FIG. 6 may be employed with the arrangement of FIG. 5 to open and close valves 27', each over a narrow range of torque values such that the output from turbine 11' is governed in torque output in the same fashion as reciprocating engine 11.

The foregoing description, taken together with the appended claims, constitutes a disclosure such as to enable a person skilled in the instrumentation and marine engineering arts and having the benefit of the teachings contained therein to make and use the invention. Further, the structure herein described meets the objects of the invention, and generally constitutes a meritorious advance in the art unobvious to such a person not having the benefit of these teachings.

Obviously, many modifications and variations are possible in the light of the above teachings, and, it is therefore understood that the invention may be practiced otherwise than as specifically described.

What is claimed is:

1. A torque control system for effecting maximum economic utilization of motive energy comprising:
    a source of rotary motive power;
    operating means connected to said source of rotary motive power for selectively altering the operational characteristics thereof;

load means having a rotary mechanical input for utilizing the rotary motive power supplied by said source of rotary motive power;

transmission means connected between said source of rotary motive power and said load means for transferring the rotary motive power therebetween thereby establishing a rotary torque drive system for said load means;

electromechanical, torque responsive transducer means attached to said load means at the rotary mechanical input thereof so as to be between said transmission means and said load means for producing an electrical analog of the torque applied thereto;

a source of electrical energy corresponding to the electrical analog signal representing the torque at a predetermined operational condition;

an electrical circuit means connected to said electromechanical, torque-responsive transducer and to said source of electrical energy for comparison thereof for the generation of a control signal in response thereto; and electrical drive means connected to said electrical circuit means to receive said control signal therefrom and connected to said operating means for controlling the application of torque by the torque drive system in response to said control signal, whereby a predetermined torque may be applied to said load means.

2. A torque control system according to claim 1 in which said source of rotary motive power includes a reciprocating engine.

3. A torque system according to claim 2 in which said operating means includes a throttle valve controlling the fuel for said reciprocating engine.

4. A torque control system according to claim 1 in which said source of rotary motive power includes a turbine motor.

5. A torque control system according to claim 4 in which said turbine motor further includes a plurality of vaned rotors each having a different diameter and said operating means includes a plurality of valves admitting operating fluid to each of said vaned rotors.

6. A torque control system according to claim 5 in which the aforesaid transmission means includes a fluid coupled torque converter.

7. A torque control system according to claim 6 in which the torque converter is connected to said electrical drive means to be controlled thereby in response to the torque analog signals from the aforesaid electromechanical transducer.

8. A torque control system according to claim 7 in which the aforesaid electrical circuit means includes:

a bridge circuit means connected to said electromechanical transducer and to said source of electrical energy for developing balance signals indicative of whether the torque analog signal is greater or less than the electrical analog signal;

a summing amplifier connected to said electromechanical transducer and to said source of electrical energy so as to amplify and combine the signal outputs thereof; and switch means connected to said bridge circuit means for control and thereby to said summing amplifier means for selective routing of the amplified and combined signal therefrom and effectively connected to each of said motors of the aforesaid electrical drive means.

9. A torque control system according to claim 1 in which said operating means includes controlled valve means connected to said source of rotary motive power for controlling the flow volume of operative fluid thereto.

10. A torque control system according to claim 1 in which said transmission means includes a fluid-coupled torque converter.

11. A torque control system according to claim 10 in which the torque converter is connected to said electrical drive means to be controlled thereby in response to the torque analog signals from the aforesaid electromechanical transducer.

12. A torque control system according to claim 1 in which said electrical drive means includes a plurality of electrical motors and effectively connected to said operating means for causing movement thereof.

13. A torque control system according to claim 12 in which the aforesaid electrical circuit means includes:

a bridge circuit means connected to said electromechanical transducer and to said source of electrical energy for developing balance signals indicative of whether the torque analog signal is greater or less than the electrical analog signal;

a summing amplifier connected to said electromechanical transducer and to said source of electrical energy so as to amplify and combine the signal outputs thereof; and switch means connected to said bridge circuit means for control and connected thereby to said summing amplifier means for selective routing of the amplified and combined signal therefrom and effectively connected to each of said motors of the aforesaid electrical drive means.

* * * * *